United States Patent
Cherchali et al.

(10) Patent No.: US 7,630,359 B1
(45) Date of Patent: Dec. 8, 2009

(54) TECHNIQUE FOR PROVIDING TRANSLATION BETWEEN THE PACKET ENVIRONMENT AND THE PSTN ENVIRONMENT

(75) Inventors: Ali Cherchali, Jackson, NJ (US); James Ehlinger, Colts Neck, NJ (US); Paul J Fellingham, Holmdel, NJ (US); Marius Jonas Gudelis, Matawan, NJ (US); Steven M Michelson, Freehold, NJ (US); James Yatsko, Raritan, NJ (US)

(73) Assignee: AT&T Corp., New York, NY (US)

( * ) Notice: Subject to any disclaimer, the term of this patent is extended or adjusted under 35 U.S.C. 154(b) by 784 days.

(21) Appl. No.: 09/966,492

(22) Filed: Sep. 28, 2001

(51) Int. Cl.
*H04L 12/66* (2006.01)

(52) U.S. Cl. ............ 370/352; 370/401; 370/465; 370/467

(58) Field of Classification Search ............ 370/351, 370/352, 389, 392, 401, 410, 463, 466, 467, 370/493, 524; 455/417
See application file for complete search history.

(56) References Cited

U.S. PATENT DOCUMENTS

| | | | | |
|---|---|---|---|---|
| 6,661,785 B1 * | 12/2003 | Zhang et al. | ............. | 370/352 |
| 6,697,357 B2 * | 2/2004 | Emerson, III | ............. | 370/352 |
| 6,700,884 B2 * | 3/2004 | Emerson, III | ............. | 370/352 |
| 6,704,305 B2 * | 3/2004 | Emerson, III | ............. | 370/352 |
| 6,731,649 B1 * | 5/2004 | Silverman | ............. | 370/466 |
| 6,771,953 B1 * | 8/2004 | Chow et al. | ............. | 455/417 |
| 6,775,269 B1 * | 8/2004 | Kaczmarczyk et al. | ...... | 370/352 |
| 6,785,301 B1 * | 8/2004 | Chapman et al. | ............. | 370/522 |
| 2002/0064152 A1 * | 5/2002 | Lemley et al. | ............. | 370/352 |
| 2003/0048772 A1 * | 3/2003 | Blum | ............. | 370/352 |
| 2003/0095542 A1 * | 5/2003 | Chang et al. | ............. | 370/352 |
| 2004/0213205 A1 * | 10/2004 | Li et al. | ............. | 370/352 |

OTHER PUBLICATIONS

U.S. Appl. No. 60/253,691.*

* cited by examiner

*Primary Examiner*—Jayanti K Patel
*Assistant Examiner*—Anthony Sol (57) ABSTRACT

Voice over Internet Protocol (VoIP) calls received in a Hybrid Fiber Coax (HFC) network (12) maintained by a provider of HFC VoIP telephony services are advantageously translated into a Time-Division Multiplex (TDM) format by an Internet Protocol Device Terminal (IPDT) (26) in the HFC network. Once translated into a TDM format, the call passes to the Public Switched Telephone Network (PSTN) (28) for call processing to afford the call features subscribed to by the called party, such as caller-ID and call waiting. Once processed, the PSTN routes the call to the destination. Likewise, a call destined for an HFC VoIP customer can be processed within the PSTN to afford the call features subscribed to by the HFC VoIP customer. In this way, the HFC VoIP telephony service can offer full-featured VoIP cable telephony without the need to perform call processing in its own network.

16 Claims, 13 Drawing Sheets

2.1 Outgoing (BTI-Originated) Call Setup

Figure 3:
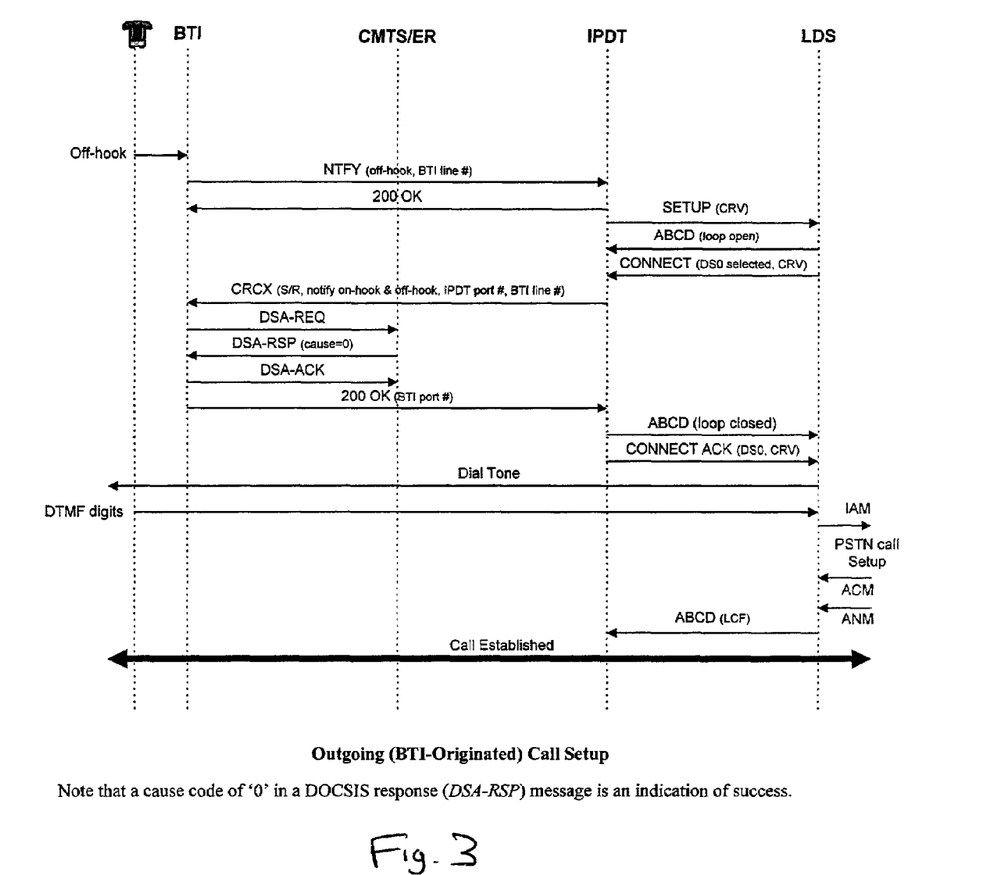
FIG. 3 depicts a signaling flow diagram for an outgoing call initiated from a Broadband Telephony Interface (BTI) comprising part of the architecture of FIG. 1.

The signaling flow for setup of an outgoing (i.e., BTI-originated) call is shown in Figure 1.

Outgoing (BTI-Originated) Call Setup

Note that a cause code of '0' in a DOCSIS response (*DSA-RSP*) message is an indication of success.

Fig. 3

2.2 INCOMING (PSTN-ORIGINATED) CALL SETUP

Figure 4:
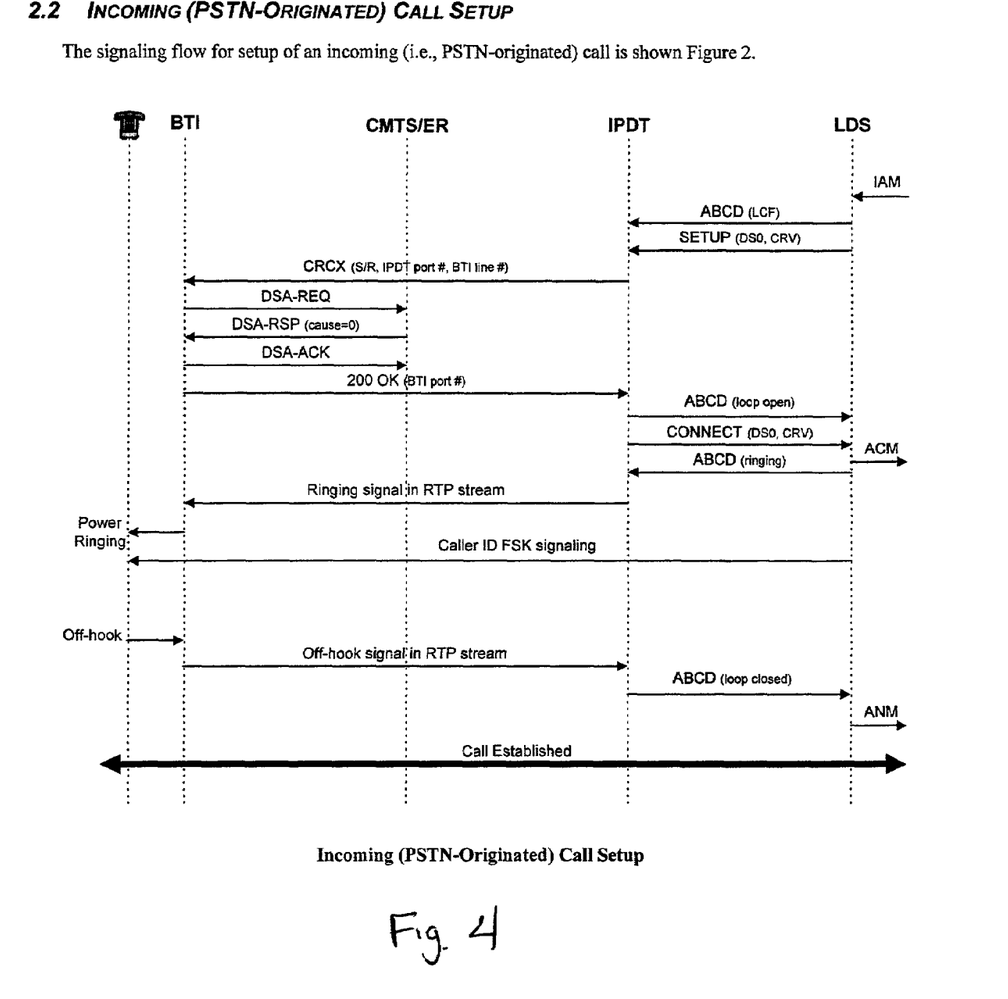
FIG. 4 depicts a signaling flow diagram for an incoming call originated at a Public Switched Telephone Network and directed to a Hybrid Fiber Coax (HFC) network both comprising part of the architecture of FIG. 1.

The signaling flow for setup of an incoming (i.e., PSTN-originated) call is shown Figure 2.

Incoming (PSTN-Originated) Call Setup

Fig. 4

2.3 BTI-INITIATED CALL TERMINATION

Figure 5:
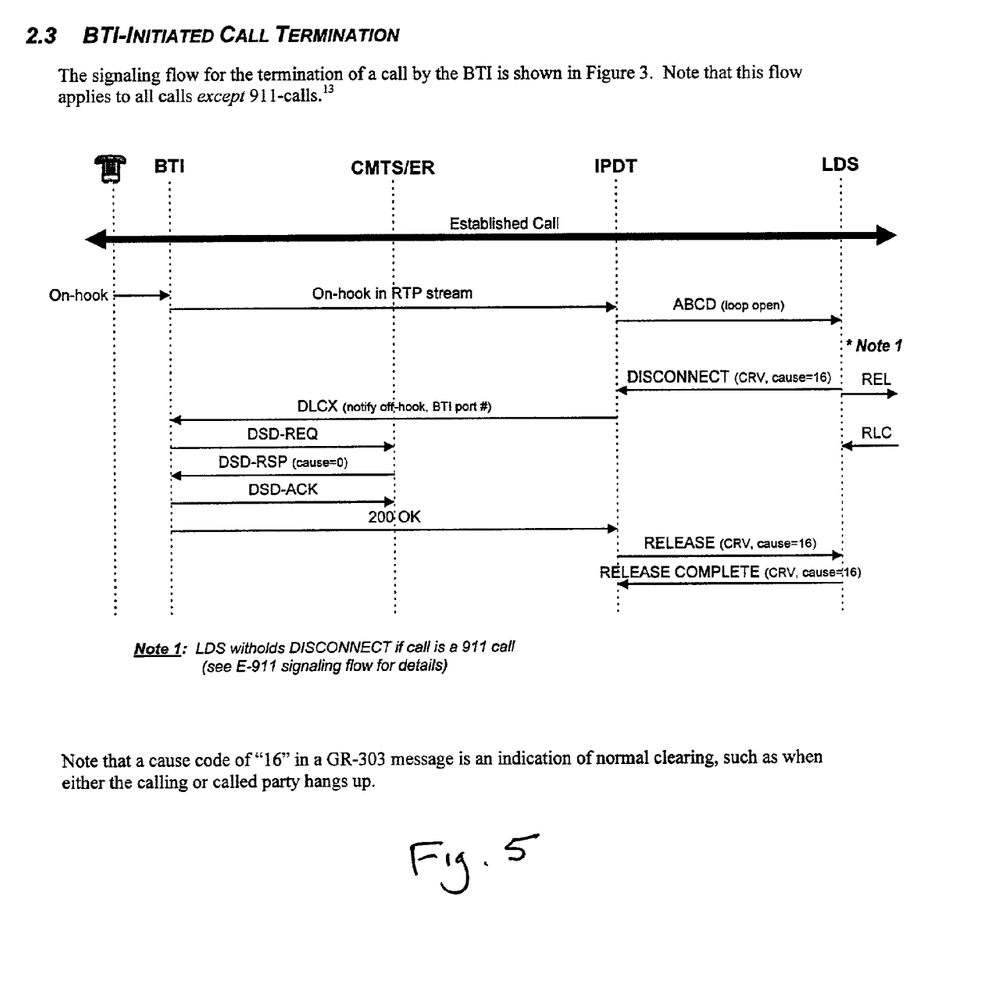
FIG. 5 depicts a signaling flow diagram associated with termination of a call at the BTI of FIG. 1.

The signaling flow for the termination of a call by the BTI is shown in Figure 3. Note that this flow applies to all calls *except* 911-calls.[13]

Note 1: *LDS witholds DISCONNECT if call is a 911 call (see E-911 signaling flow for details)*

Note that a cause code of "16" in a GR-303 message is an indication of normal clearing, such as when either the calling or called party hangs up.

Fig. 5

2.4 PSTN-INITIATED CALL TERMINATION

Figure 6:
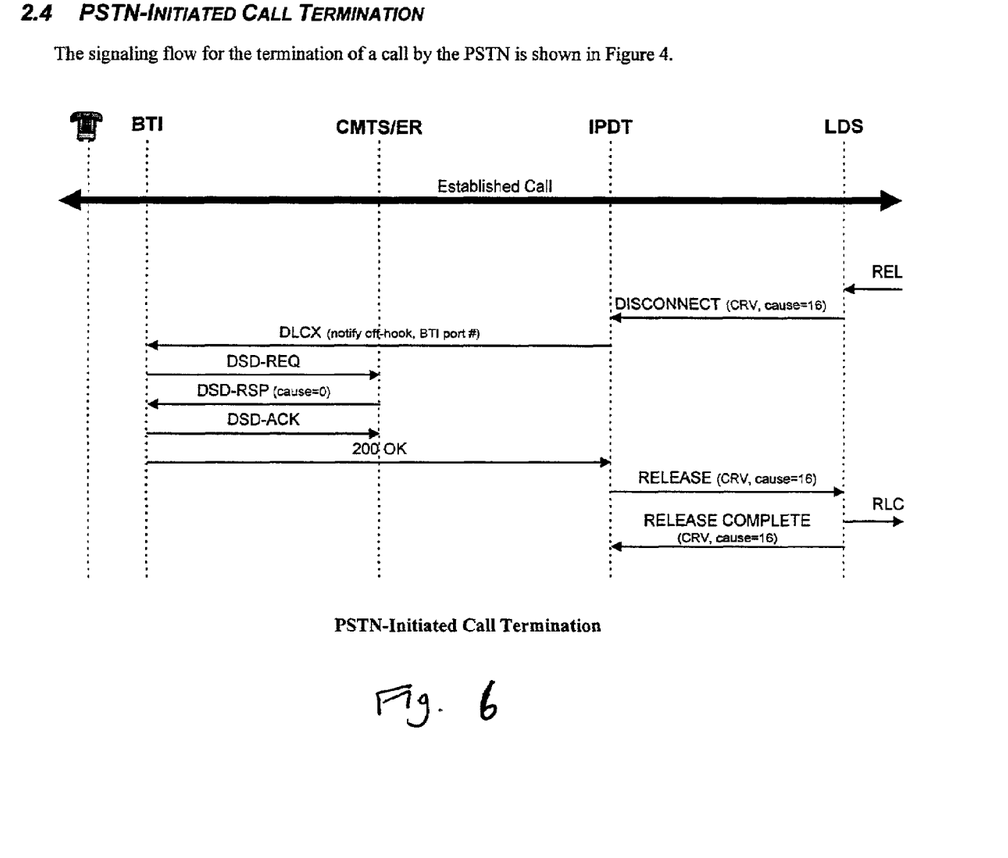
FIG. 6 depicts a signaling flow diagram associated with termination of a call at the PSTN of FIG. 1.

The signaling flow for the termination of a call by the PSTN is shown in Figure 4.

PSTN-Initiated Call Termination

Fig. 6

2.5 CALLER ID WITH CALL WAITING

Figure 7:
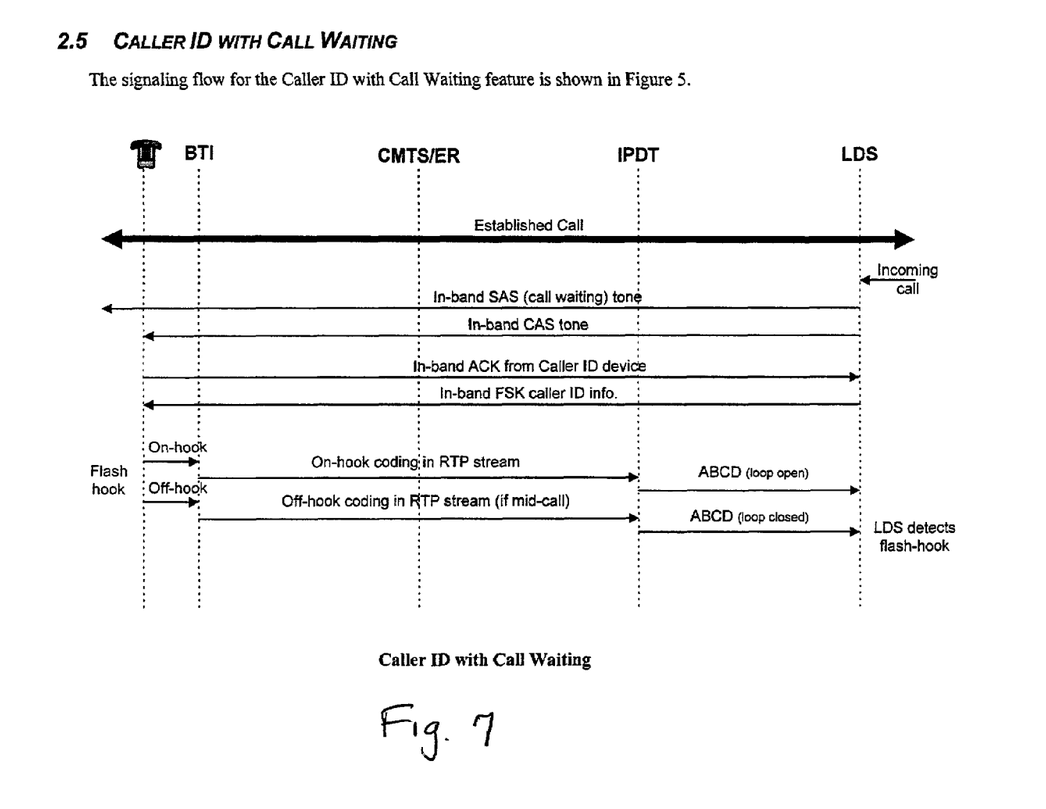
FIG. 7 depicts a signaling flow diagram associated with providing Caller ID with Call Waiting service.

The signaling flow for the Caller ID with Call Waiting feature is shown in Figure 5.

Caller ID with Call Waiting

Fig. 7

2.6 MESSAGE WAITING INDICATION (ON-HOOK)

Figure 8:
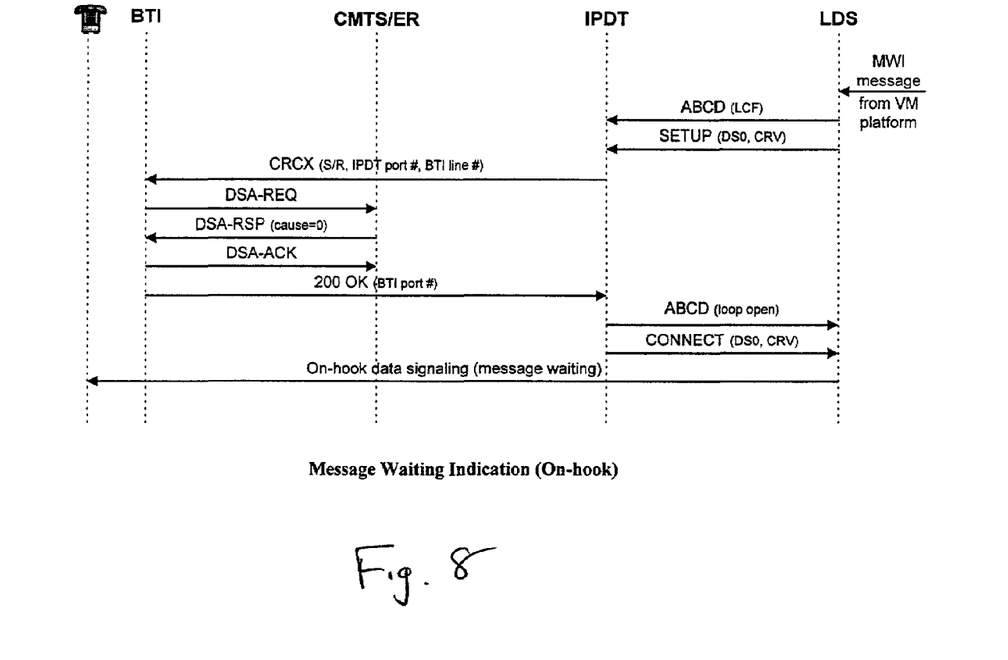
FIG. 8 depicts a signaling flow diagram associated with providing a message waiting indication.

The signaling flow for the on-hook indication of a waiting message (for the Message Waiting feature) is shown in Figure 6.

Message Waiting Indication (On-hook)

Fig. 8

2.7 EMERGENCY (E-911) CALL

Figure 9:
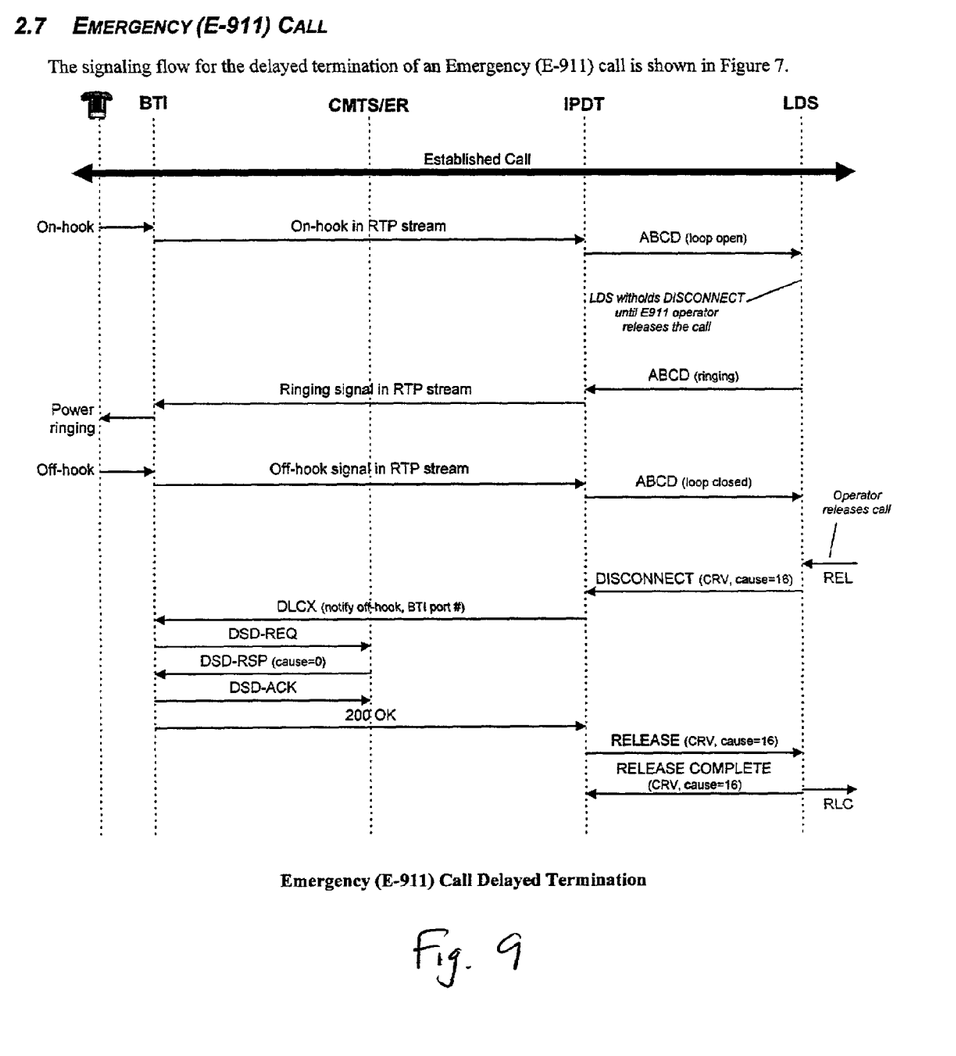
FIG. 9 depicts a signaling flow diagram associated with an emergency (911) call.

The signaling flow for the delayed termination of an Emergency (E-911) call is shown in Figure 7.

Emergency (E-911) Call Delayed Termination

Fig. 9

2.8 BANDWIDTH UNAVAILABLE (OUTGOING CALL ATTEMPT)

Figure 10:
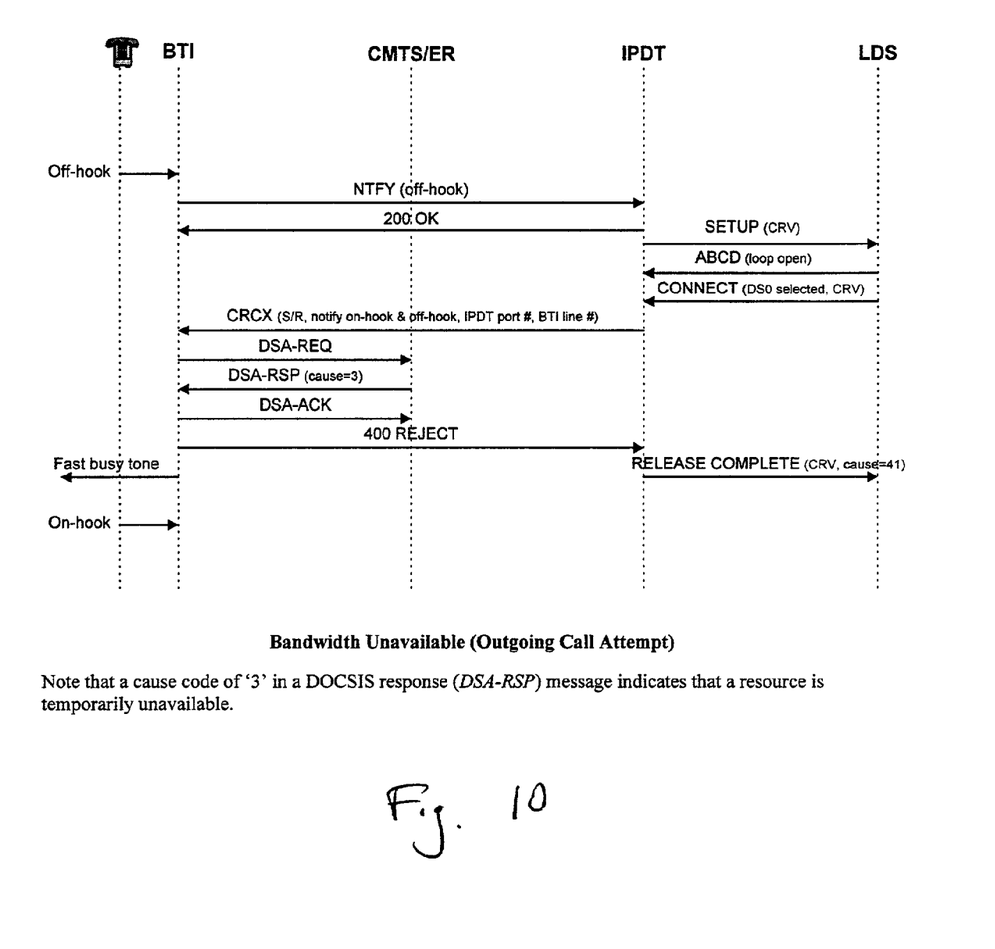
FIG. 10 depicts a signaling flow diagram associated with a call attempt originated from the BTI of FIG. 1 when bandwidth in the HFC network is unavailable.

The signaling flow for an outgoing (BTI-originated) call attempt for which bandwidth is unavailable is shown in Figure 8.

Bandwidth Unavailable (Outgoing Call Attempt)

Note that a cause code of '3' in a DOCSIS response (*DSA-RSP*) message indicates that a resource is temporarily unavailable.

Fig. 10

2.9 RESOURCE UNAVAILABLE (OUTGOING CALL ATTEMPT)

Figure 11:
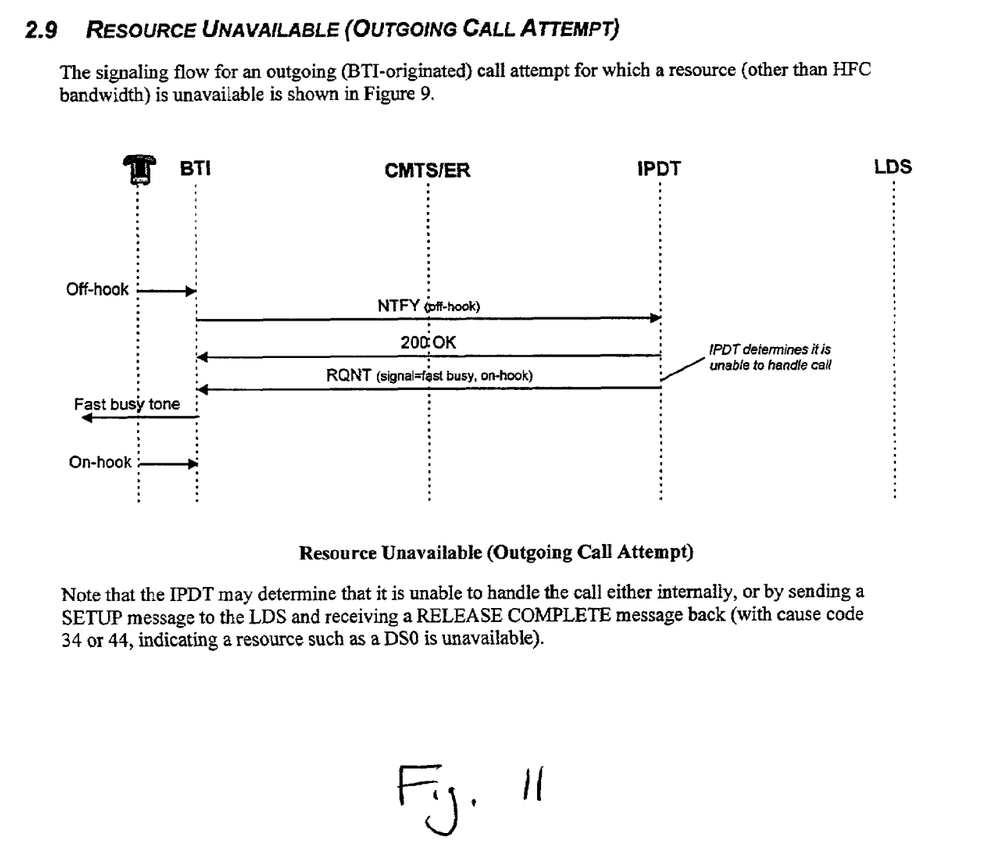
FIG. 11 depicts a signaling flow diagram associated with a call attempt originated from the BTI of FIG. 1 when a network resource, other than the HFC network, is unavailable.

The signaling flow for an outgoing (BTI-originated) call attempt for which a resource (other than HFC bandwidth) is unavailable is shown in Figure 9.

Resource Unavailable (Outgoing Call Attempt)

Note that the IPDT may determine that it is unable to handle the call either internally, or by sending a SETUP message to the LDS and receiving a RELEASE COMPLETE message back (with cause code 34 or 44, indicating a resource such as a DS0 is unavailable).

Fig. 11

2.10 BANDWIDTH UNAVAILABLE (INCOMING CALL ATTEMPT)

Figure 12:
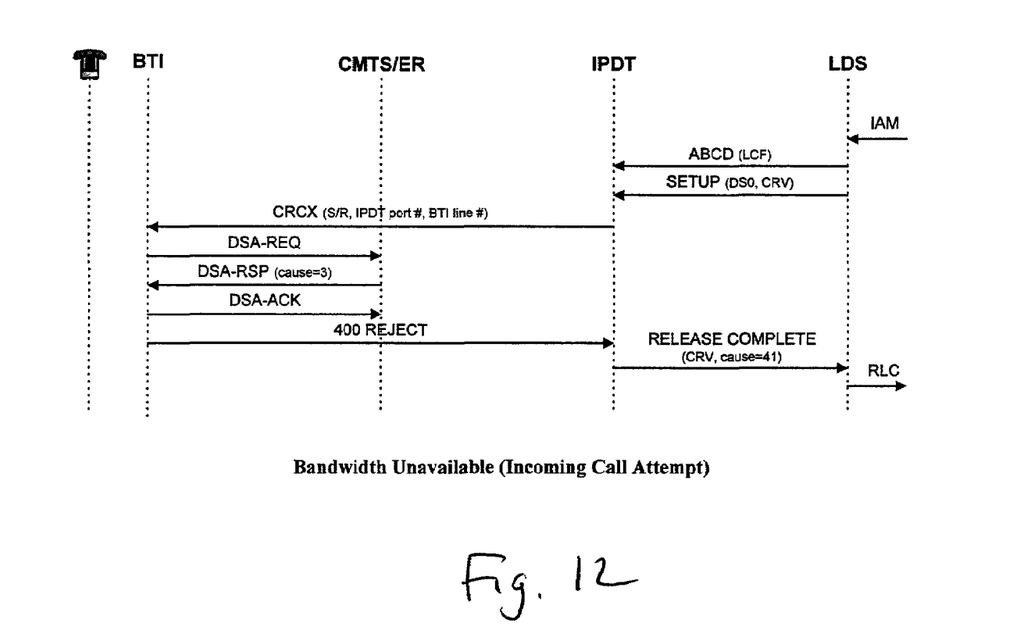
FIG. 12 depicts a signaling flow diagram associated with a call attempt originated from the PSTN of FIG. 1 when bandwidth in the HFC network is unavailable.

The signaling flow for an incoming (PSTN-originated) call attempt for which bandwidth is unavailable is shown in Figure 10.

Bandwidth Unavailable (Incoming Call Attempt)

Fig. 12

2.11 PERMANENT SIGNAL CONDITION (POST-CALL)

Figure 13:
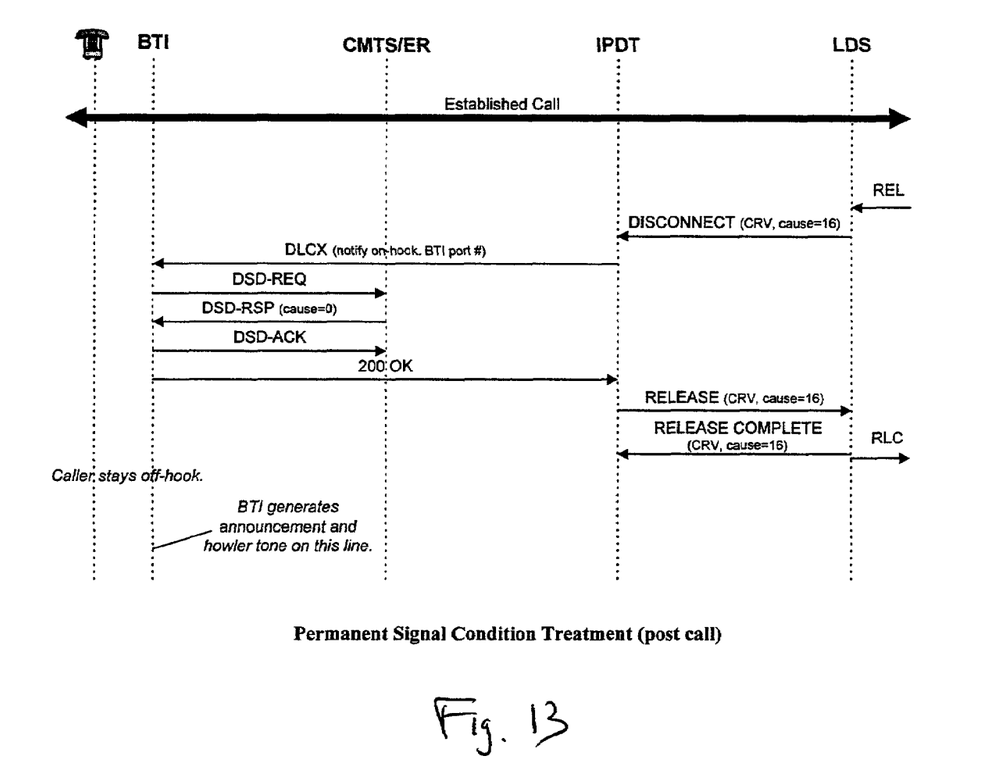
FIG. 13 depicts a signaling flow diagram associated with a first post-call permanent signal condition, such as when a customer does not hang up after the other party to the call has disconnected.

The signaling flow for handling a permanent signal condition caused by the customer not hanging up in a timely manner after the other party on the call has disconnected is shown in Figure 11.

Permanent Signal Condition Treatment (post call)

Fig. 13

2.12 PERMANENT SIGNAL CONDITION (NO DIGITS DIALED)

Figure 14:
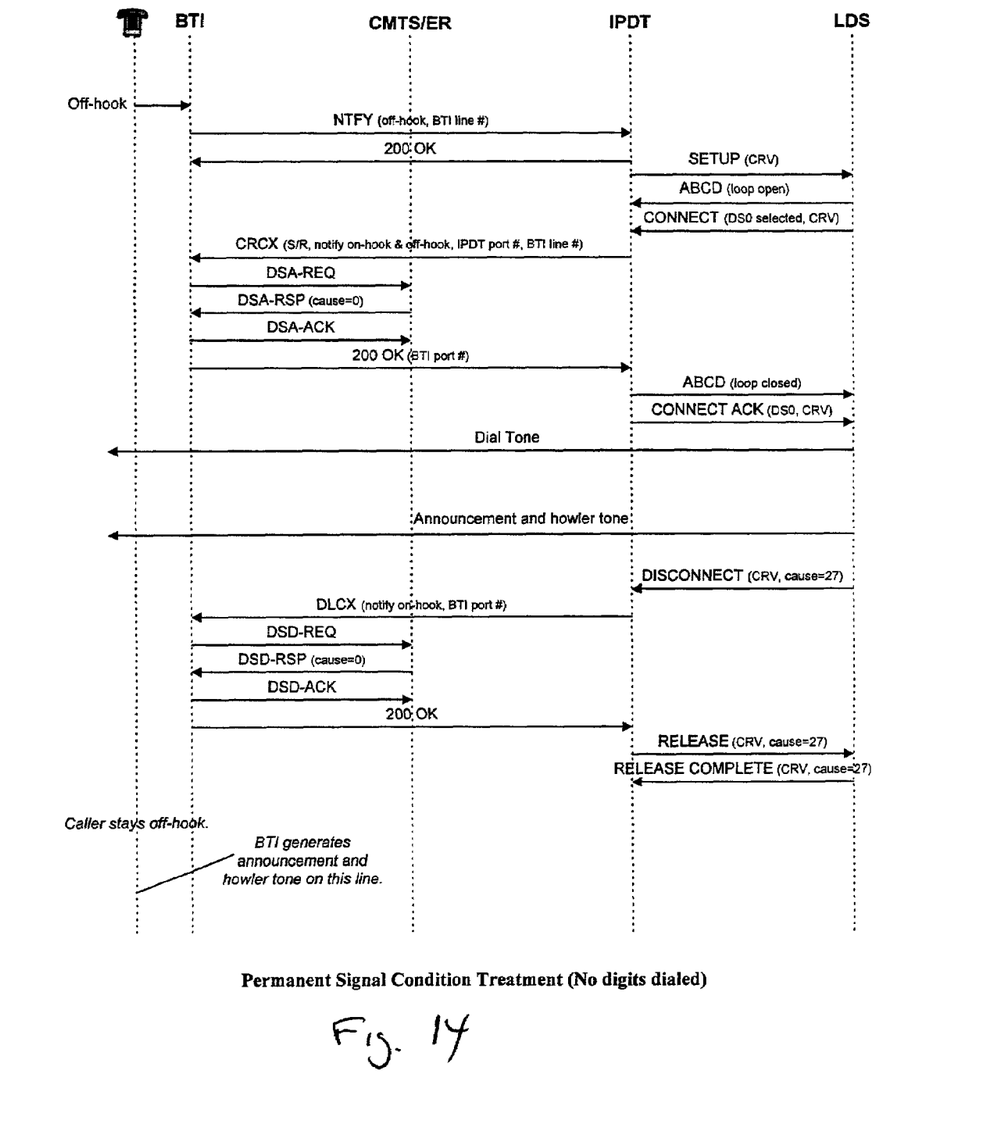
FIG. 14 depicts a signaling flow diagram associated with a second post-call permanent condition, such as when a customer goes off-hook and does not enter any digits.

The signaling flow for handling a permanent signal condition caused by a customer going off-hook and not entering any digits, is shown in Figure 12.

Permanent Signal Condition Treatment (No digits dialed)

Fig. 14

TECHNIQUE FOR PROVIDING TRANSLATION BETWEEN THE PACKET ENVIRONMENT AND THE PSTN ENVIRONMENT

TECHNICAL FIELD

This invention relates to a technique for translating information passing between a packet network and a Time-Division Multiplexed (TDM) network, such as a Public Switched Telephone Network (PSTN).

BACKGROUND ART

Traditionally, telephone subscribers received local service (i.e., dial tone) from a Local Exchange Carrier (LEC), typically operated by a Regional Bell Operating Company (RBOC) or an independent telephone carrier. In many geographic areas, telephone subscribers may now receive local telephone service from their provider of cable television services.

In order to attract subscribers, cable television service providers must offer telephony service comparable to that currently available from a LEC. In other words, the cable telephony service available from the cable television provider should offer a comparable array of features, such as Caller Identification, Call Waiting and Voice Mail, to name a few, that are available to subscribers of traditional local telephony service. In practice, LEC-based subscribers receive special-featured local telephony service via a central office switch programmed to provide such features, such as a Lucent 5ESS® switch manufactured by Lucent Inc, Murray Hill, N.J. Some cable television service providers also employ traditional central office telephone switches on their own premises to offer analog cable telephony with comparable features.

Currently, there is a trend by cable television service providers to offer Voice-over-Internet Protocol (VoIP) telephony service via the provider's Hybrid Fiber-Coax (HFC) network. In order to provide a full array of features to subscribers of these HFC VoIP telephony services, cable television service providers have had to provide the necessary call processing features in their own networks usually by way of an IP-Soft Switch, often at significant expense.

Thus, there is a need for a technique that affords a cable television service provider the ability to offer fully-featured VoIP telephony service yet avoids the need to perform the requisite call processing in the cable television service provider's own network.

BRIEF SUMMARY OF THE INVENTION

Briefly, in accordance with a preferred embodiment of the invention, a method is provided for offering full-featured Voice-over Internet Protocol (VoIP) telephony service. In accordance with the method, a first network, typically a Hybrid-Fiber Coax (HFC) network maintained by a provider of cable television services, receives an incoming packet-based VoIP call from a subscriber. Within the first network, the packet-based VoIP call is translated into a Time-Division-Multiplexed (TDM)-based call compatible with a TDM-based second network, such as the Public Switched Telephone Network (PSTN). In connection with such translation, signaling protocol support functions are performed in the first network, typically at an Internet Protocol Digital Terminal (IPDT), to enable the first network, and particularly, a Broadband Telephony Interface (BTI) in the first network that receives customer calls, to act as if the first (HFC) network were performing call processing features that would otherwise require an IP Soft switch or similar call processing mechanism. The first network routes the call to the second network (i.e., the PSTN), while at the same time, the first network maps IP signaling information into a format compatible with switching equipment within the second network to allow that network to perform call processing to afford the desired call features. Thereafter, the second network routes the call to its destination, which may lie within the first or second networks. If the call destination lies within the first network, the second network returns the call back to the first network for translation back to the VoIP format. Otherwise, if the destination lies within the second network, the call is routed with no further translation.

DETAILED DESCRIPTION

Figure 1:
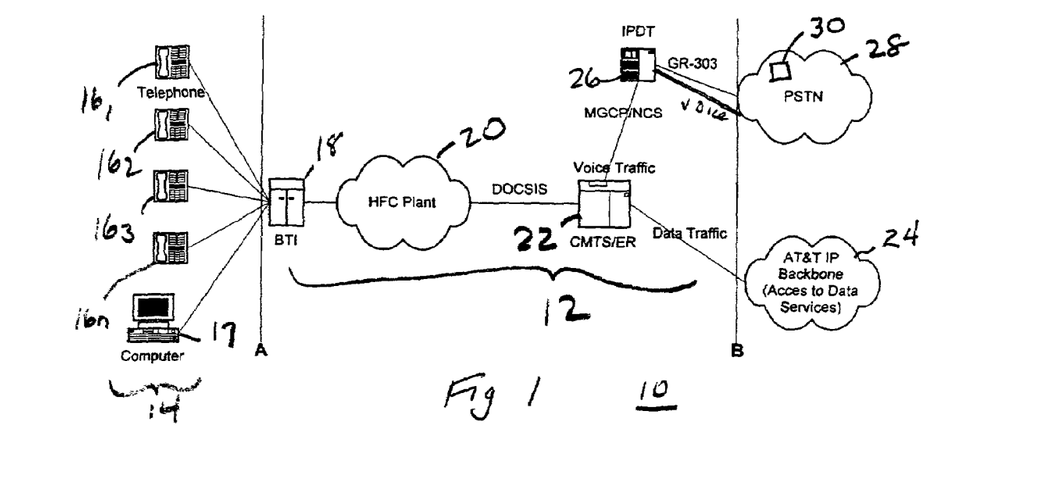
FIG. 1 depicts a block schematic diagram of a network architecture in accordance with a preferred embodiment of the invention for providing full-featured VoIP telephone service.

FIG. 1 illustrates a network architecture 10 in accordance with a preferred embodiment of the invention for affording full-featured VoIP telephony service. The network architecture 10 includes a first network 12 for providing packet-based communications services to a customer premises 14 that includes one or more voice telephone sets, illustratively depicted by telephone sets $16_1, 16_2, 16_3 \ldots 16_n$ where n is an integer greater than zero. The customer premises 14 may also include one or more data communications devices, such as a computer 17. To interface with the telephone sets $16_1$-$16_n$ and the data communications device 17, the network 12 includes a Broadband Telephony Interface (BTI) 18 typically situated at customer premises 14. The BTI 18 enables each of the telephone sets $16_1$-$16_n$ to initiate VoIP calls to, and receive VoIP calls from the network 12, provided that the customer subscribes to such service.

In the illustrated embodiment, the network 12 comprises a Hybrid Fiber-Coax (HFC) network of the type maintained by a provider of cable television service. An HFC plant 20 connects the BTI 18 to a Cable Modem Termination System/Edge Router (CMTS/ER) 22 such that the link between the BTI and the CMTS/ER complies with the Data Over Cable System Interface Specification (DOCSIS). The CMTS/ER 22 separates packet-based VoIP calls originated at the customer-premises from one of the telephone sets $16_1$-$16_n$ at the customer premises 14, from data traffic originated from the data communications device 17. The CMTS/ER 22 routes the data traffic to an IP backbone network 24 for routing to a provider of data services (not shown), such as an Internet Services Provider (ISP).

In accordance with the invention, the CMTS/ER 22 routes VoIP calls originated at the BTI 18 to an Internet Protocol Digital Terminal (IPDT) 26 described in greater detail hereinafter with respect to FIG. 2. The IPDT 26 advantageously translates the packet-based VoIP calls, which may include signaling information in a Media Gateway Control Protocol (MGCP) or in a Network-based Call Signaling (NCS) protocol, into a TDM-based bearer channel, and a signaling channel typically in the GR-303 format. Both the bearer and signaling channels are received at a TDM-based telecommunications network 28, such as the Public Switched Telephone Network (PSTN).

As discussed in greater detail in connection with the signaling flows depicted in FIGS. 3-14, the IPDT 26 performs signaling protocol support functions that allow the BTI 18 to interact with the HFC network 12 as if the HFC network performed the call processing itself via an IP-Soft switch or similar mechanism. Moreover, the IPDT 26 also maps IP signaling information from the CMTS/ER 22 associated with an originating call into a format useful for the PSTN 28.

Within the PSTN 28 is at least one central office switch (Local Digital Switch or LDS), exemplified by switch 30, such as the Lucent 5ESS® central office switch. It is the central office switch 30 (or if necessary, a combination of central office switches if the ingress switch lacks the requisite call processing ability) that processes the call translated by the IPDT 26. Thus, call processing occurs within the PSTN 28 at the switch 30 rather than in the network 12.

Performing call processing in the PSTN 28, in accordance with the invention, rather than in the network 12 affords several advantages. First and foremost, utilizing the PSTN 28 to perform call processing avoids the need to provide the necessary call-processing infrastructure within the HFC network 12 itself, such as by way of an IP-Soft switch or similar call processing mechanism. Moreover, the switch 30 within the PSTN 28 will already possess the requisite hardware and software needed to perform a full array of calling features. Such switches will typically support a full set of CLASS[SM] (a service mark of Telcordia, Inc, Piscataway, N.J.), custom calling and Centrex features, such as Caller ID with Call Waiting for example, since this switch provides such features to present-day POTS customers served by the PSTN 28. In accordance with the present invention, the IPDT 26 translates a VoIP call to a TDM format, and performs the signaling protocol support functions and the required mapping to allow routing of the call to the PSTN 28 for processing. In this way, the network 12 can offer the same features on a VoIP call as are offered in the PSTN 28 for a POTS call, without the need for any IP-Soft switch or the like.

Figure 2:
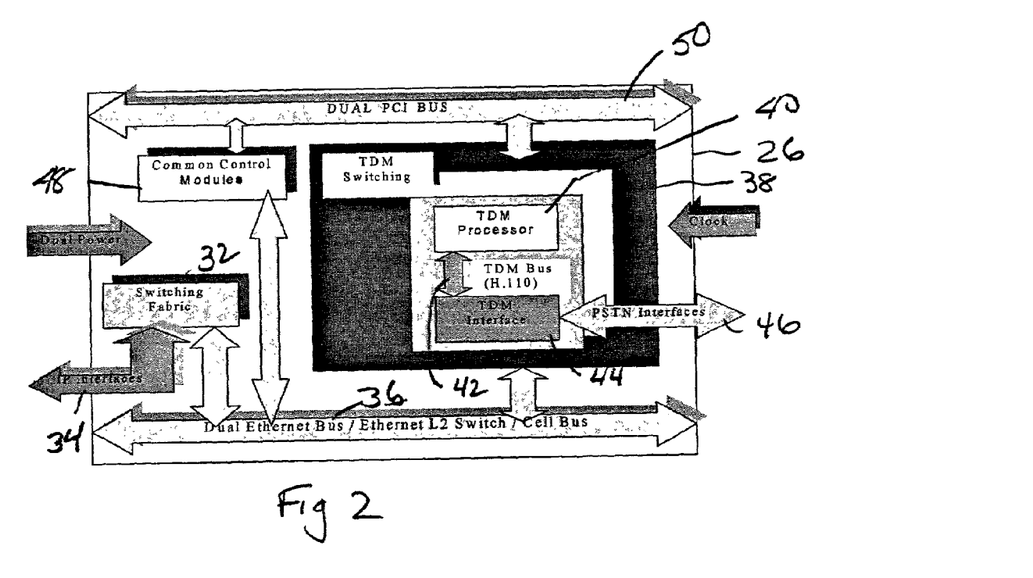
FIG. 2 depicts a block schematic diagram of an Internet Protocol Digital Terminal comprising part of the network architecture of FIG. 1.

FIG. 2 depicts a block schematic diagram of an illustrative embodiment of the IPDT 26 of FIG. 1. As illustrated in FIG. 2, the IPDT 26 includes a switching fabric 32 for routing traffic received via an IP interface 34 that supports a shared interface for voice and signaling traffic. The switching fabric 32 routes the traffic from the IP interface 34 onto a dual Ethernet Bus 36 for communication to a TDM switching module 38. The TDM switching module 38 includes a TDM processor 40 that converts voice packets into TDM signals. Additionally, the TDM switching module 38 provides the necessary Digital Signal Processor (DSP) resources for compression if needed. A TDM bus 42 connects the TDM processor 40 to a TDM interface 42 that provides an external customer interface to the PSTN 28 of FIG. 1 through a PSTN interface 46. A common control module 48 provides configuration, management control and monitoring of elements within the IPDT 26 through a Dual Peripheral Component Interconnect (PCI) bus 50.

To best understand the manner in which calls are processed in accordance with the invention, FIGS. 3-14 depict exemplary signaling flows for various conditions. Referring to FIG. 3, there is shown the signaling flow for an outgoing call initiated from the BTI 18. The signaling flow commences as follows:

1. A customer at one of the telephone sets $16_1$-$16_n$ lifts the handset to connect to an idle line.
2. The BTI 18 of FIG. 1 senses the off-hook condition and thereafter notifies the IPDT 26 of FIG. 1 of this event (via a NTFY message), indicating the IP address and port number (indicative of which of its lines is now off-hook) of the BTI 18.
3. Upon receipt of this notification, the IPDT 26 sends an acknowledgement to the BTI 18 (via a 200 OK message).
4. The IPDT 26 then maps the received BTI IP address and line number into the IPDT Interface Group and Call Reference Value (IG/CRV) on the GR-303 interface to the switch 30 of FIG. 1 within the PSTN 28. The IPDT 26 requests a connection to the switch 30 for this call, indicating the derived Call Reference Value, by sending a SETUP message on the specific Interface Group assigned to the BTI 18.
5. On receipt of the SETUP message, the switch 30 of FIG. 1 determines if it is able to process the call and whether an idle channel (DS0) is available on this Interface Group.
6. If the switch 30 is able to handle the new call, it indicates to the IPDT 26 that it is ready to proceed, using GR-303 Time-slot Management Channel (TMC) signaling. The switch 30 of FIG. 1 then selects an idle DS0 within the Interface Group and notifies the IPDT 26 which DS0 to use for this call (via a CONNECT message).
7. If the switch 30 is unable to handle the new call, or if no DS0 is available, the switch notifies the IPDT 26 (via a RELEASE COMPLETE message). The IPDT 26 will notify the BTI 18 (via a 400 REJECT message) and release resources for this call. Upon receipt of the 400 REJECT message, the BTI 18 will play fast busy tone to the customer, ending the call.
8. Upon receipt of a CONNECT message, the IPDT 26 requests the BTI 18 to create a connection (via a CRCX message). Included in this request is an instruction for the BTI 18 to notify the IPDT 26 when the BTI subsequently detects either an off-hook or an on-hook event, along with the IPDT port number to be used for this call.

9. On receipt of the request from the IPDT 26 to create a connection, the BTI 18 requests the CMTS/ER 22 to provide resources (i.e., bandwidth) for this call (via the DOCSIS protocol).
10. If the requested bandwidth is granted by the CMTS/ER 22 (as allocated via a DOCSIS unsolicited grant), the BTI 18 informs the IPDT 26 which BTI port number will be used for this call (via a 200 OK message). A media path (Real Time Protocol (RTP) stream) is now established between the assigned ports on the BTI 18 and the IPDT 26.
11. If bandwidth is unavailable, the CMTS/ER 22 will reject the request and the BTI 18 will play fast busy to the customer, ending the call.
12. However, when the IPDT 26 knows that the BTI 18 has been allocated bandwidth for the call, the IPDT signals to the switch 30 of FIG. 1 that the calling party is off-hook (using GR-303 TMC signaling) and acknowledges the DS0 assignment (via a CONNECT ACK message). Upon notification that the calling party is off-hook, the switch 30 of FIG. 1 provides dial tone to indicate its readiness to handle the call. If the customer has subscribed to a voice mail service and has a message waiting, the switch 30 of FIG. 1 will apply stutter dial tone.
13. Upon hearing dial tone, the customer enters the telephone number of the desired called party.
14. Since an RTP bearer path has been established between the BTI 18 and the switch 30 of FIG. 1, the customer-entered digits are passed in-band to the switch, as they are entered, one-by-one. Note that all the local-switch-based capabilities are available to the caller at this point.
15. The switch 30 of FIG. 1 processes the dialed digits and proceeds to set up the call through the PSTN 28.
16. Upon receipt of far-end answer supervision, the switch 30 of FIG. 1 notifies the IPDT 26 that the called party has answered (using GR-303 TMC signaling).
17. A two-way, end-to-end call path is now established and conversation can commence.

FIG. 4 illustrates the signaling flow for a call originating in the PSTN 28 that is dialed to one of the telephones 16₁-16ₙ.

1. A call destined for one of the telephones 16₁-16ₙ at the HFC VoIP customer's premises 14 arrives at the switch 30 of the PSTN 28 associated with that customer.
2. Upon receipt of the incoming call, the switch 30 of FIG. 1 determines the Interface Group and Call Reference Value corresponding to the received Called Party Number. The switch 30 of FIG. 1 then (1) notifies the IPDT 26 that it wishes to initiate a call over this Interface Group (using GR-303 TMC signaling); (2) selects an idle channel DS0; and (3) notifies the IPDT 26 which DS0 will be used for this call (via a SETUP message).
3. On receipt of the SETUP message, the IPDT 26 determines whether its internal cache has a valid mapping for the received Call Reference Value for this Interface Group (IG/CRV). The IPDT 26 will not have a valid mapping if, for example, this BTI 18 has not previously received an incoming call, or if the lease on its assigned IP address has expired.
4. If the IPDT 26 has a valid mapping, the IPDT determines the IP address currently assigned to the called party's BTI 18.
5. If the IPDT 26 does not have the IG/CRV mapping in its cache, it maps the IG/CRV value to the called party's Fully Qualified Domain Name (FQDN). The association between an IG/CRV value and an FQDN/BTI port number is pre-provisioned in the IPDT 26.
6. The IPDT 26 then queries its Domain Name Server (DNS) (not shown), which returns the IP address and line number of the BTI 18 associated with the specified FQDN. The returned value will be stored in the IPDT 26's internal cache for future calls.
7. Upon determining the IP address of the BTI 18, the IPDT 26 requests the BTI to create a connection (via a CRCX message). Included in this request is the BTI 18 line number to which the call is destined.
8. On receipt of the request to create a connection, the BTI 18 requests the CMTS/ER 22 to provide resources (i.e., bandwidth) for this call (via the DOCSIS protocol).
9. If the requested bandwidth is granted by the CMTS, the BTI 18 informs the IPDT 26 which BTI port number will be used for this call (via a 200 OK message). A media path (RTP stream) is now established between the assigned ports on the IPDT 26 and the BTI 18.
10. If bandwidth is unavailable, the CMTS will reject the request. The BTI 18 will notify the IPDT 26, which in turn informs the switch 30 of FIG. 1 via a RELEASE COMPLETE message.
11. Once the IPDT 26 knows that the BTI 18 has been allocated bandwidth for the call, the IPDT signals to the switch 30 of FIG. 1 that the called party is on-hook (using GR-303 TMC signaling) and conforms the DS0 assignment (via a CONNECT message).
12. Upon notification that the called party is on-hook, the switch 30 of FIG. 1 instructs the IPDT 26 to "ring" the called party's telephone line (using GR-303 TMC signaling). The switch 30 of FIG. 1 will control the specific ringing pattern to be used. This enables the switch 30 of FIG. 1 to apply, for example, the Distinctive Ringing feature.
13. The IPDT 26 passes the ringing instruction (and ringing pattern) to the BTI 18 in-band.
14. On receipt of and for the duration of the ringing instruction, the BTI 18 applies power ringing on the line associated with the called number.
15. If the called party has subscribed to any of the Caller ID features, the switch 30 sends the calling party's telephone number and/or name in-band between the first and second ring cycle. Note that if the calling party's number/name is unavailable or if this information is marked private, an appropriate indication will be provided.
16. Upon hearing ringing, the called party answers the telephone.
17. Upon detection of the off-hook event, the BTI 18 stops power ringing and notifies the IPDT 26 by transmitting an off-hook signal in the RTP stream.
18. The IPDT 26 in turn will notify the switch 30 of FIG. 1 (via GR-303 TMC signaling).
19. A two-way, end-to-end call path is now established and conversation can commence.

FIG. 5 depicts the signaling flow associated with termination of the call by the BTI 18. This call termination flow applies regardless of which party initiated the call and applies to all calls except emergency (911) calls as discussed hereinafter.

1. The HFC VoIP Telephony customer hangs up the handset, or depresses the switch hook (with the intent of terminating the current call).
2. Upon detection of the on-hook event, the BTI 18 will notify the IPDT 26 by transmitting an on-hook signal in the RTP stream.
3. The IPDT 26 in turn will notify the switch 30 of FIG. 1 (via GR-303 TMC signaling).

4. After a brief time-out period (if applicable), the switch 30 of FIG. 1 will interpret and process the on-hook event as a request to terminate the call. A brief timeout period is required for customers subscribed to a Call Waiting feature in order for the switch 30 of FIG. 1 to distinguish between a flash-hook (an on-hook, off-hook sequence) from an actual on-hook event. For customers who are not subscribed to Call Waiting, this timeout period is not required.

5. If the HFC VoIP customer didn't initiate the call (i.e., this customer is the called party), the switch 30 of FIG. 1 will apply Timed Release Disconnect treatment. Timed Release Disconnect treatment allows a called party to hang up for a short period (typically a maximum of 12 seconds) and then pick up again, without disconnecting the call (provided the caller stays off-hook). This enables a called party to, for example, continue the call in a different room.

6. Upon expiration of the Timed Release Disconnect interval, or immediately if this call was initiated by the HFC VoIP customer, the switch 30 sends a DISCONNECT message to the IPDT 26 (indicating a normal cause for termination). The switch 30 also sends an ISUP release (REL) message to any other PSTN switch involved in this call.

7. Upon receipt of the DISCONNECT message, the IPDT 26 requests the BTI 18 to delete the connection (via a DLCX message). Included in this request is an instruction for the BTI 18 to notify the IPDT 26 of any future off-hook event.

8. Upon receiving a delete connection request, the BTI 18 requests the CMTS/ER 22 to release resources for this call, via the DOCSIS protocol.

9. When the resources are released, the BTI 18 acknowledges the request from the IPDT 26 to delete the connection (via a 200 OK message).

10. Upon acknowledgement, the IPDT 26 sends a RELEASE message to the switch 30 of FIG. 1 (indicating a normal cause for release).

11. The switch 30 of FIG. 1 in turn responds to the IPDT 26 with a RELEASE COMPLETE message, thereby completing the release of all the resources associated with this call.

FIG. 6 illustrates the signaling flow associated with termination of a call by the PSTN 28 of FIG. 1 between a far-end customer (not shown) and the customer premises 14 of FIG. 1. This call termination flow applies regardless of which party initiated the call.

1. The far-end customer hangs up the handset, or depresses the switch hook (with the intent of terminating the current call).

2. Upon detection of the on-hook event, the far-end customer's local switch (not shown) will send an ISUP release (REL) message across the PSTN 28 to the near-end switch (e.g., switch 30 of FIG. 1) associated with the customer premises 14, either immediately if the far-end customer initiated this call, or after the Timed Release Disconnect interval if the far-end customer did not initiate the call.

3. Upon receipt of the ISUP release message from the PSTN 28, the switch 30 of FIG. 1 will inform the IPDT 26 via a DISCONNECT message (indicating a normal cause for release).

4. Upon receipt of the DISCONNECT message, the IPDT 26 instructs the BTI 18 to delete the connection (via a DLCX message). The instruction includes a request for the BTI 18 to notify the IPDT 26 of any future off-hook event.

5. Upon receiving an instruction to delete the connection, the BTI 18 requests the CMTS to release resources for this call, via the DOCSIS protocol.

6. When the resources are released, the BTI 18 acknowledges the request of the IPDT 26's to delete the connection (via a 200 OK message).

7. Upon receipt of the acknowledgement from the BTI 18, the IPDT 26 sends a RELEASE message to the switch 30 of FIG. 1 (indicating a normal cause for release).

8. The switch 30 of FIG. 1, in turn, responds to the IPDT 26 with a RELEASE COMPLETE message, thereby completing the release of all the resources associated with this call. The switch 30 of FIG. 1 also sends an ISUP release complete (RLC) message to any other PSTN switch involved in this call.

FIG. 7 illustrates the signaling flow associated with providing a HFC VoIP customer on an established call with notification of another incoming call along with the identity of the new caller (telephone number and/or name). This signaling flow only applies if the HFC VoIP customer has subscribed to the Caller ID with Call Waiting feature and commences when a new incoming call arrives at the switch 30 of FIG. 1 for a the HFC VoIP customer that is already on an established call.

1. Upon receipt of an incoming call destined for the HFC VoIP customer, the switch 30 of FIG. 1 transmits an in-band Subscriber Alerting Signal (SAS), also known as a. call waiting tone, followed by an in-band CPE Alerting Signal (CAS tone).

2. Upon detection of the CAS tone, a Caller ID mechanism (not shown) associated with one of the telephones $16_1$-$16_n$ of FIG. 1 responds with an in-band acknowledgement, indicating its readiness to receive the Caller ID information.

3. Upon receipt of this acknowledgement, the switch 30 of FIG. 1 transmits the Caller ID information via in-band Frequency Shift Keying (FSK) signaling.

4. If the customer wishes to talk with the new caller, the customer hangs up the handset or depresses the switch hook (with the intent of doing so only briefly, so as to indicate a flash-hook), or presses the "flash" key on the telephone. (Note that if the customer does not wish to talk to the new caller, the customer can ignore the Call Waiting tone and the new caller will continue to hear ringing (resulting in a "ring-no-answer" condition).

5. Upon detection of the on-hook event, the BTI 18 will notify the IPDT 26 by transmitting an on-hook signal in the RTP stream.

6. The IPDT 26 in turn will notify the switch 30 of FIG. 1 of the on-hook event (via GR-303 TMC signaling).

7. If the customer picks up the handset or releases the switch hook very quickly, before the switch 30 of FIG. 1 has decided to release the call, or if the customer had pressed the flash key, the BTI 18 will notify the IPDT 26 by transmitting an off-hook signal in the RTP stream.

8. The IPDT 26 in turn will notify the switch 30 of FIG. 1 of the off-hook event (via GR-303 TMC signaling).

9. The switch 30 of FIG. 1 will interpret and process the on-hook/off-hook events as a flash-hook signal and invoke the appropriate feature (in this example, the Call Waiting feature).

10. The customer continues to interact with the Call Waiting feature in the normal way.

FIG. 8 depicts the signaling flow that occurs when a HFC VoIP Telephony customer subscribing to a voice mail service receives a notification of a new voice mail message, via the message-waiting indicator (not shown) on a suitably equipped device, such as one of the telephone sets $16_1$-$16_n$. The message-waiting indicator only becomes activated when the caller is on-hook. If the customer is off-hook the indication will be delayed until after the customer has terminated the current call. The signaling flow is as follows:

1. The switch 30 of FIG. 1 associated with the HFC VoIP customer receives notification from the voice mail platform (not shown) that the customer has a new voice mail message.
2. Upon receipt of the notification, the switch 30 determines the Interface Group and Call Reference Value (IG/CRV) corresponding to the Called Party Number received from the voice mail platform. The switch 30 notifies the IPDT 26 that it wishes to initiate a call over this Interface Group (using GR-303 TMC signaling) selects an idle DS0 and notifies the IPDT 26, which DS0 will be used for this call (via a SETUP message).
3. On receipt of the SETUP message, the IPDT 26 determines whether its internal cache has a valid mapping for the received Call Reference Value for this Interface Group.
4. If the IPDT 26 has a valid mapping, the IPDT determines the IP address currently being used by the called party's BTI 18.
5. If the IPDT 26 does not have the IG/CRV mapping in its cache, it maps the IG/CRV value to the called party's FQDN. The IPDT 26 then queries its DNS server, which returns the IP address of the BTI 18 associated with the specified FQDN. The returned value will be stored in the internal cache of the IPDT 26 for future calls.
6. Upon determining the IP address of the BTI 18, the IPDT 26 requests the BTI to create a connection (via a CRCX message). The request includes the line number of the BTI 18 to which the call is destined.
7. If the requested bandwidth is granted by the CMTS/ER 22, the BTI 18 informs the IPDT 26 which BTI port number will be used for this call (via a 200 OK message). A media path (RTP stream) is now established between the assigned ports on the IPDT 26 and the BTI 18.
8. If bandwidth is unavailable, the CMTS/ER 22 will reject the request and the IPDT 26 will inform the switch 30 of FIG. 1 via a RELEASE COMPLETE message, ending the signaling flow under this condition. The switch 30 of FIG. 1 may re-attempt message delivery at a later time, as determined by the implementation of the voice mail feature.
9. Once the IPDT 26 knows that the BTI 18 has been allocated bandwidth for the call, the IPDT signals to the switch 30 of FIG. 1 that the called party is on-hook (using GR-303 TMC signaling) and confirms the DS0 assignment (via a CONNECT message).
10. Upon notification that the called party is on-hook, the switch 30 of FIG. 1 sends the message-waiting indicator to the BTI 18 via in-band FSK signaling.
11. As soon as the message waiting indication has been sent, the "call" is torn down in the same manner as a PSTN-initiated call termination described with respect to FIG. 6.

FIG. 9 depicts the signaling flow associated with delayed termination of an emergency call, such as a 911 call directed to an Emergency Services Application Platform (ESAP) (not shown) served by the PSTN 28. An emergency (E-911) call is established just like any other call. Only the switch 30 of FIG. 1 and the E-911 ESAP are aware that a 911 call is in progress. The 911 call terminates in the same as any other BTI 18-initiated call termination, as depicted in FIG. 5, except for one important difference. In order for the E-911 operator to gather sufficient information about the location of the caller, the call resources must remain "active" even after the caller hangs up. To keep the resources active, control of 911-calls is given to the E-911 operator. When the caller hangs up at the end of a normal (non-911) call, the switch 30 of FIG. 1 will automatically respond to the on-hook indication with a DISCONNECT message as described previously. However, on a 911 call, the switch 30 of FIG. 1 does not send back the DISCONNECT message until it receives an instruction to release from the E-911 operator.

FIG. 10 depicts the signaling flow associated with an outgoing call attempt originated from a BTI, such as BTI 18 of FIG. 1 for which HFC bandwidth is unavailable. As may be appreciated, the first eight steps of the signaling flow is identical to the signaling flow depicted in FIG. 3. When insufficient bandwidth is detected, then, as illustrated in FIG. 10, the BTI 18 notifies the IPDT 26 (typically via a 400 REJECT message) that insufficient bandwidth exists to make the call, and that the connection to the switch 30 of FIG. 1 can be released. In turn, the IPDT 26 notifies the switch 30 to complete a release. Thereafter, the BTI 18 sends a fast busy signal, or other suitable indication to the customer indicating the inability to complete a call. In response, the customer goes on-hook.

FIG. 11 depicts the signaling flow associated with an outgoing call attempt originated from a BTI, such as BTI 18 of FIG. 1 for which a resource other than HFC bandwidth, is unavailable. Like the signaling flow of FIG. 3, the signaling flow of FIG. 11 includes the steps of 1. A subscriber at one of the telephone sets $16_1$-$16_n$ lifts the handset to connect to an idle line.
2. The BTI 18 of FIG. 1 senses the off-hook condition and notifies the IPDT 26 of this event (via a NTFY message), indicating the address of the BTI 18 and which of its lines is now off-hook.
3. Upon receipt of this notification, the IPDT 26 of FIG. 1 sends an acknowledgement to the BTI 18 of FIG. 1 (via a 200 OK message).
4. If the IPDT 26 determines that it is unable to handle the call, then the IPDT signals the BTI 18, typically via an RQNT message. Thereafter, the BTI 18 sends a fast busy signal, or other suitable indication to the customer indicating the inability to complete a call. In response, the customer goes on-hook.
5.

FIG. 12 depicts the signaling flow associated with an incoming call attempt originated from the PSTN 28 for which bandwidth is unavailable in the HFC network 12. The signaling flow of FIG. 12 includes the same steps as steps (1)-(7) described with respect to FIG. 4. However, upon determining insufficient bandwidth exists, the BTI 18 notifies the IPDT 26 (typically via a 400 REJECT message) that insufficient bandwidth exists to make the call, and that the connection to the switch 30 of FIG. 1 can be released. In turn, the IPDT 26 notifies the switch 30 to complete a release.

FIG. 13 depicts the signaling flow associated with a permanent signaling condition caused by the HFC VoIP customer failing to go on-hook (i.e., hang up) after the other party has gone on-hook. FIG. 13 includes substantially the same steps as the PSTN-initiated call termination signaling flow depicted in FIG. 6, with the additional step of having the BTI 18 generate an announcement and a howler tone (or other warning) to the customer to hang-up when the BTI detects that the customer has remained off-hook for more than a prescribed interval.

FIG. 14 depicts the signaling flow associated with the permanent signaling condition occurring when the HFC VoIP customer goes off-hook, but fails to dial any digits. The signal flow of FIG. 14 includes the initial call set-up steps of (1)-(12) of FIG. 3 including the step of providing dial tone. If, after a prescribed time interval, the switch 30 of FIG. 1 fails to receive any dialed digits, then the switch sends a howler tone or other warning to the customer. Thereafter, the PSTN 28 terminates the call via steps depicted in the call signaling flow shown in FIG. 6.

As part of the above-described call signaling flows, the IP signaling information developed in the first network 12 includes on-hook and off-hook line status of the customer premises equipment (e.g., the telephone) that originated the call and the GR-303 format includes ABCD signaling bits, with the line status in the IP signaling information mapped to the equivalent line status in the ABCD signaling bits. Additionally, the IP signaling information may include a power ringing indication, and the GR-303 format includes the ABCD signaling bits, with the power ringing indication received via the ABCD signaling bits mapped to an equivalent power ringing indication in the IP signaling information.

The foregoing describes a technique for providing full-featured VoIP telephony service in an HFC network without the need for the network to employ switch resources to perform switch-based call processing.

The above-described embodiments merely illustrate the principles of the invention. Those skilled in the art may make various modifications and changes that will embody the principles of the invention and fall within the spirit and scope thereof.

What is claimed is:

1. A method for providing full-featured Voice-over Internet Protocol (VoIP) telephony service, comprising the steps of:
receiving in a first network a packet-based VoIP call, wherein the first network is a Hybrid-Fiber Coax network;
translating, within the first network, the VoIP call into a Time-Division Multiplexed (TDM) call compatible with a second network having a capability of processing TDM calls and providing at least one feature for the TDM call, the translating comprises sub-steps of (1) performing required signal processing protocols in the first network to allow the VoIP call to interact with the first network as if the first network was performing switch-based processing functions and (2) mapping IP signaling information developed in the first network into a format suitable for processing by the second network;
routing the TDM call to the second network;
processing the TDM call in the second network; and
routing the TDM call to its intended destination.

2. The method according to claim 1 wherein the translating step includes translating the VoIP call into a bearer portion and a signaling portion.

3. The method according to claim 2 wherein the IP signaling information is mapped into a GR-303 format to include performance as well as functional call aspects to allow full-featured processing by the second network.

4. The method according to claim 3 wherein the IP signaling information includes on-hook and off-hook line status of customer premises equipment (CPE) on which the packet-based VoIP call originated, and the GR-303 format includes ABCD signaling bits, wherein the line status in the IP signaling information is mapped to an equivalent line status in the ABCD signaling bits.

5. The method according to claim 4 wherein the IP signaling information includes a power ringing indication, and the GR-303 format includes the ABCD signaling bits, wherein the power ringing indication received via the ABCD signaling bits is mapped to an equivalent power ringing indication in the IP signaling information.

6. The method according to claim 1 wherein the second network is a public switched telephone network.

7. The method according to claim 1 wherein the at least one feature includes at least one of: a CLASS feature, a custom calling feature, or a Centrex feature.

8. The method according to claim 1 wherein the routing step includes translating the TDM call back to a VoIP call if the destination lies in the first network.

9. A method for providing full-featured Voice-over Internet Protocol (VoIP) telephony service, comprising the steps of:
receiving in a first network a packet-based VoIP call and a plurality of non-voice packets, wherein the first network is a Hybrid-Fiber Coax network;
separating the non-voice packets from the VoIP call;
routing the non-voice packets to a data network;
translating, within the first network, the VoIP call into a Time-Division Multiplexed (TDM) call compatible with a second network having a capability of processing TDM calls and providing at least one feature for the TDM call, the translating comprises sub-steps of (1) performing required signal processing protocols in the first network to allow the VoIP call to interact with the first network as if the first network was performing switch-based processing functions and (2) mapping IP signaling information developed in the first network into a format suitable for processing by the second network;
routing the TDM call to the second network;
processing the TDM call in the second network; and
routing the TDM call to its intended destination.

10. The method according to claim 9 wherein the translating step includes translating the VoIP call into a bearer portion and a signaling portion.

11. The method according to claim 9 wherein the IP signaling information includes a power ringing indication, and a GR-303 format that includes ABCD signaling bits, wherein the power ringing indication received via the ABCD signaling bits is mapped to an equivalent power ringing indication in the IP signaling information.

12. The method according to claim 9 wherein the IP signaling information includes on-hook and off-hook line status of customer premises equipment (CPE) on which the packet-based VoIP call originated, and the GR-303 format includes ABCD signaling bits, wherein the line status in the IP signaling information is mapped to an equivalent line status in the ABCD signaling bits.

13. The method according to claim 9 wherein the IP signaling information is mapped into a GR-303 format so as to include performance as well as functional call aspects to allow full-featured processing by the second network.

14. The method according to claim 9 wherein the second network is a public switched telephone network.

15. The method according to claim 9 wherein the at least one feature includes at least one of: a CLASS feature, a custom calling feature, or a Centrex feature.

16. The method according to claim 9 wherein the routing step includes translating the TDM call back to a VoIP format if the destination lies in the first network.

* * * * *